(12) United States Patent
Nogues-Correig

(10) Patent No.: US 11,585,946 B2
(45) Date of Patent: Feb. 21, 2023

(54) SYSTEMS AND METHODS FOR DE-NOISING GNSS SIGNALS

(71) Applicant: SPIRE GLOBAL SUBSIDIARY, INC., San Francisco, CA (US)

(72) Inventor: Oleguer Nogues-Correig, Glasgow (GB)

(73) Assignee: SPIRE GLOBAL SUBSIDIARY, INC., San Francisco, CA (US)

( * ) Notice: Subject to any disclaimer, the term of this patent is extended or adjusted under 35 U.S.C. 154(b) by 89 days.

(21) Appl. No.: 17/322,799

(22) Filed: May 17, 2021

(65) Prior Publication Data

US 2021/0278547 A1 Sep. 9, 2021

Related U.S. Application Data

(63) Continuation of application No. 16/037,204, filed on Jul. 17, 2018, now Pat. No. 11,009,609.

(51) Int. Cl.
| | | |
|---|---|---|
| *G01S 19/32* | (2010.01) | |
| *G01S 19/23* | (2010.01) | |
| *G01S 19/24* | (2010.01) | |
| *G01S 19/21* | (2010.01) | |

(52) U.S. Cl.
CPC ............ *G01S 19/32* (2013.01); *G01S 19/21* (2013.01); *G01S 19/23* (2013.01); *G01S 19/246* (2013.01)

(58) Field of Classification Search
CPC ......... G01S 19/32; G01S 19/21; G01S 19/246
See application file for complete search history.

(56) References Cited

U.S. PATENT DOCUMENTS

| | | |
|---|---|---|
| 5,678,169 A | 10/1997 | Turney |
| 5,736,961 A | 4/1998 | Fenton et al. |
| 6,061,390 A | 5/2000 | Meehan et al. |
| 7,260,160 B1 | 8/2007 | Lennen |
| 7,358,896 B2 | 4/2008 | Gradincie et al. |
| 7,706,431 B2 | 4/2010 | Eerola et al. |

(Continued)

OTHER PUBLICATIONS

U. Acikov, Open Loop Tracking of Rising GPS Radio Occultation Signals, Master of Science in Engineering Thesis, Dec. 2011 (Year : 2011).*

(Continued)

*Primary Examiner* — Bernarr E Gregory
*Assistant Examiner* — Fred H Mull
(74) *Attorney, Agent, or Firm* — Steven M. Koehler; Westman, Champlin & Koehler, P.A.

(57) ABSTRACT

Certain implementations of the disclosed technology may include systems and methods for reducing noise in dual-frequency GNSS signal observation. The method can include: receiving, at a GNSS receiver, a first signal and a second signal. At least the second signal includes noise. The first signal is characterized by a first carrier frequency, and the second signal is characterized by a second carrier frequency. The method includes: down converting, sampling, cross-correlating, accumulating, determining ambiguous instantaneous phases, determining non-ambiguous instantaneous phases, producing normalized non-ambiguous instantaneous first phase samples, constructing a normalized first counter rotation phasor, generating a counter-rotated second observable, applying a low pass filter to remove noise; and outputting the filtered second observable.

20 Claims, 8 Drawing Sheets

(56) References Cited

U.S. PATENT DOCUMENTS 8,630,332 B2 1/2014 Young
2002/0005801 A1 1/2002 Lyusin
2016/0011314 A1 1/2016 Chen et al.

OTHER PUBLICATIONS

Sophie Hetet, "Signal-to-Noise Ratio Effects on the Quality of GPS Observations," Department of Geodesy and Geomatics, Canada. Aug. 30, 2000.
O. Julien et al., "Estimating Ionospheric Delay using GPS/Galileo Signals in the E5 Band", InsideGNSS, p. 54-64, Mar./Apr. 2015 (2015).

* cited by examiner

SYSTEMS AND METHODS FOR DE-NOISING GNSS SIGNALS

CROSS-REFERENCE TO RELATED APPLICATIONS

This application is a Continuation of U.S. patent application Ser. No. 16/037,204 filed, Jul. 17, 2018, now U.S. Pat. No. 11,009,609 B2, which is incorporated by reference in its entirety.

FIELD

The disclosed technology relates to the utilization of GNSS signals, and in particular, to systems and methods for reducing noise in dual-frequency GNSS signal observation by removing noise from a first observable signal using a second observable signal.

BACKGROUND

Global Navigation Satellite Systems (GNSS) are satellite systems that can include the United States' Global Positioning System (GPS), Russia's GLONASS, the European Union's GALILEO, the Chinese BEIDOU, the Japanese QZSS, and/or the Indian IRNSS. Such systems broadcast signals at more than one frequency and are used primarily for navigation applications, for example, to determine receiver positioning. GPS, for example, has been in operation since 1978 (globally since 1994) and was initially developed to provide precise positioning for military purposes. Today, GNSS systems are used for many civilian and military applications including navigation, surveying, time referencing, geo-fencing, weather data, self-driving cars, etc.

As the GNSS electromagnetic signals are broadcast and traverse the intervening distances from satellite transmitters in orbit and are received at receivers, noise can be introduced into the associated signals. For example, noise can be introduced into the signals due to many factors and sources, such as the ionosphere, atmosphere, radio signal interference, noisy transmitters, noisy receivers etc. Such noise can cause errors in any GNSS-related application that exploits the observation of coherent signal propagation delays, such as GPS trilateration, radio occultation calculations, phase-delay GNSS-R based altimetry, etc.

A need exists for improved systems and methods to address such challenges.

BRIEF SUMMARY

Some or all of the above needs may be addressed by certain implementations of the disclosed technology. Certain implementations of the disclosed technology may include systems and methods for reducing noise in coherent dual-frequency GNSS signal observations.

According to an example implementation of the disclosed technology, a method is provided that can include reducing noise in dual-frequency GNSS signal observation. The method can include: receiving, at a GNSS receiver, a first signal and a second signal. At least the second signal includes noise. The first signal is characterized by a first carrier frequency, and the second signal is characterized by a second carrier frequency. The method includes: down converting the first and second signals to respective first baseband and second baseband signals; sampling the first baseband and second baseband signals to produce complex first samples and complex second samples; cross-correlating and accumulating the complex first samples and the complex second samples; determining ambiguous instantaneous first phase of the complex first samples; determining non-ambiguous instantaneous first phase samples of the complex first samples; producing normalized non-ambiguous instantaneous first phase samples by multiplying the non-ambiguous instantaneous first phase samples by the second carrier frequency divided the first carrier frequency; constructing a normalized first counter rotation phasor by taking a complex exponential of a negated version of the normalized non-ambiguous instantaneous first phase samples; generating a counter-rotated second observable by multiplying the complex second samples by the normalized first counter-rotation phasor; applying a low pass filter to the counter-rotated second observable to remove noise; and outputting the filtered second observable.

According to another example implementation, a GNSS receiver is provided. The GNSS receiver includes an antenna, a front end, an RF to baseband converter, one or more analog to digital (A/D) converters, a digital signal processing (DSP) processor, and memory in communication with the DSP processor. The GNSS receiver is configured to: receive, at the antenna, a first signal and a second signal. At least the second signal includes noise. The first signal is characterized by a first carrier frequency, and the second signal is characterized by a second carrier frequency. The GNSS receiver is configured to: filter, by the front end, at least a portion of the received first and second signals; down convert, with the RF to baseband converter, the filtered first and second signals to respective first baseband and second baseband signals; sample, with the one or more A/D converters, the first baseband and second baseband signals to produce complex first samples and complex second samples; accumulate the complex first samples and the complex second samples; determine, with the DSP processor, non-ambiguous instantaneous first phase samples of the complex first samples; produce normalized non-ambiguous instantaneous first phase samples by multiplying the non-ambiguous instantaneous first phase samples of the complex first samples by the second carrier frequency divided the first carrier frequency; construct a normalized first counter rotation phasor by taking a complex exponential of a negated version of the normalized non-ambiguous instantaneous first phase samples; generate a counter-rotated second observable by multiplying the complex second samples by the normalized first counter-rotation phasor; apply a low pass filter to the counter-rotated second observable to remove noise; and output the filtered second observable.

According to another example implementation, a non-transitory computer readable storage medium is provided for storing instructions for use with one or more processors in communication with a memory. The instructions are configured to cause the one or more processors to perform a method including: receiving, at a GNSS receiver, a first signal and a second signal, wherein at least the second signal includes noise, and wherein the first signal is characterized by a first carrier frequency, and wherein the second signal is characterized by a second carrier frequency; down converting the first and second signals to respective first baseband and second baseband signals; sampling the first baseband and second baseband signals to produce complex first samples and complex second samples; cross-correlating and accumulating the complex first samples and the complex second samples; determining ambiguous instantaneous first phase of the complex first samples; determining non-ambiguous instantaneous first phase samples of the complex first samples; producing normalized non-ambiguous instantaneous first phase samples by multiplying the non-ambiguous instantaneous first phase samples by the second carrier frequency divided the first carrier frequency; constructing a normalized first counter rotation phasor by taking a complex exponential of a negated version of the normalized non-ambiguous instantaneous first phase samples; generating a counter-rotated second observable by multiplying the complex second samples by the normalized first counter-rotation phasor; applying a low pass filter to the counter-rotated second observable to remove noise; and outputting the filtered second observable.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Some implementations of the disclosed technology will be described more fully hereinafter with reference to the accompanying drawings. This disclosed technology may however, be embodied in many different forms and should not be construed as limited to the implementations set forth herein. Certain example implementations will now be discussed in detail with reference to FIGS. 1-7.

Figure 1:
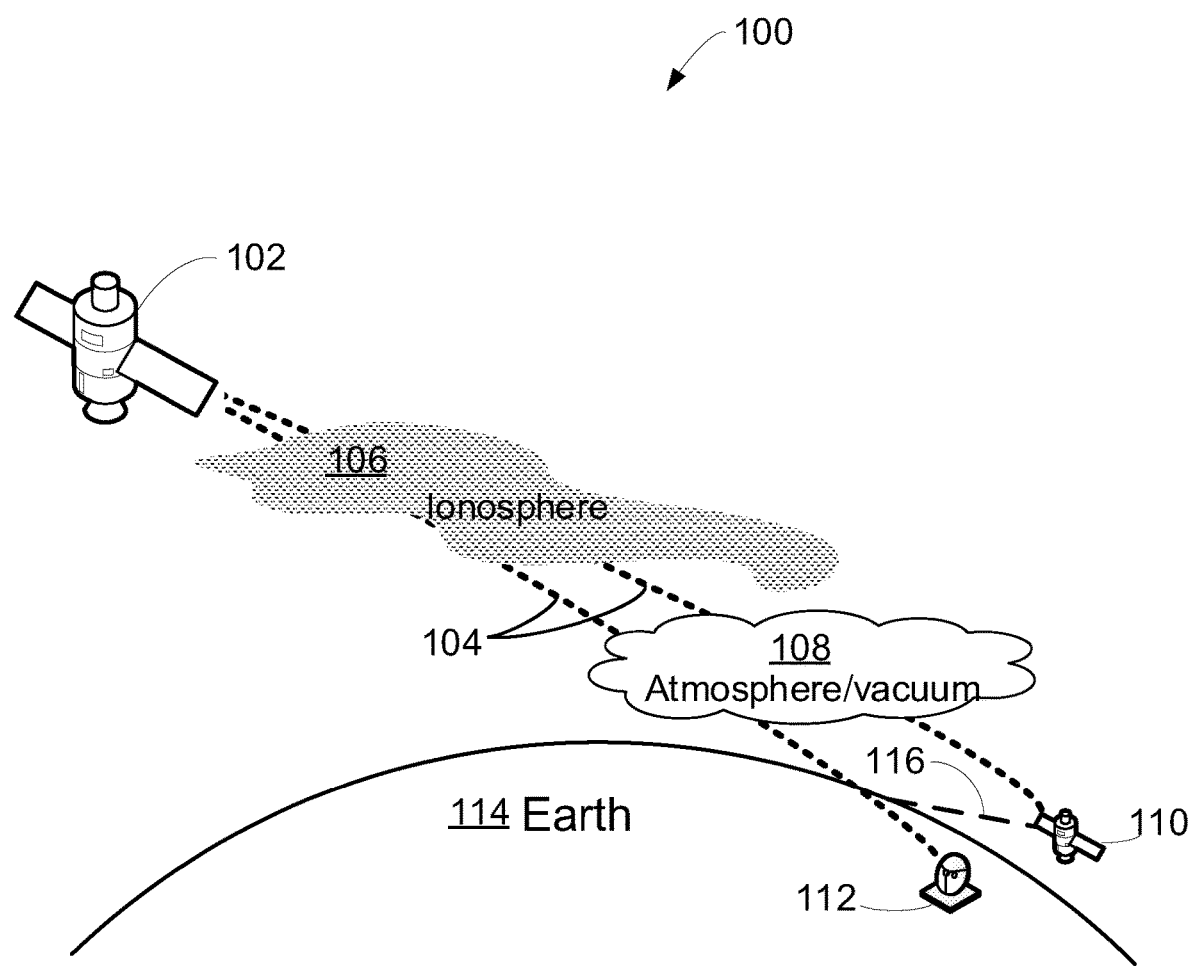
FIG. 1 depicts example satellite communication scenarios 102, which may utilize embodiments of the disclosed technology.

FIG. 1 depicts example satellite communications scenarios 100, for which the disclosed technology may be applied. In a first scenario, a satellite 102 (such as a GNSS satellite) may transmit GNSS signals 104 (such as encoded and broadcast GPS signals) to one or more remote receivers.

In one example implementation of the disclosed technology, the remote receiver may be associated with a satellite 110 in low-earth orbit and may be utilized for taking GNSS-radio occultation (GNSS-RO) measurements. In other example implementations, the remote receiver may be associated with a terrestrial base station 112 located on earth 114. In other scenarios (not shown), the base station 112 may be installed on ship at sea.

In certain example implementations, the GNSS signals 104 may pass through the ionosphere 106 and/or the atmosphere 108 and may be diffracted (or occulted) by the ionosphere 106 and/or the atmosphere 108. In certain example implementations, the GNSS signals 104 may also be reflected 116, for example, from the earth 114. When the electromagnetic radiation signals 104 pass through the atmosphere, the signal is refracted depending on the gradient of refractivity normal to the path, which in turn depends on the density gradient of the medium through which the signals 104 pass. The refraction effect can be calculated using the Doppler shift of the received signals 104 given the geometry of the transmitter and receiver. According to an example implementation of the disclosed technology, information regarding the atmosphere's temperature, pressure and water vapor content may be derived from the Doppler shift determined by GNSS-RO measurements, and may provide information for meteorology applications. Under certain circumstances, the GNSS signals 104 may be reflected 116 off the Earth surface and still maintain coherence, for example, if the surface is smooth enough compared to the wavelength in use. Hence, it is possible to observe (at the satellite 110 in low-earth orbit and/or base station 112) the phase delay in the GNSS signals 104 after reflections 116 over the sea, ice caps, or land. These reflected 116 observations can be exploited for altimetry purposes (i.e., to map the actual "height" of the point of the surface where the signal is reflected), reaching altimetry precisions of fractions of the wavelength. This can be exploited to map the topography of the land or sea surface with centimeter to decimeter level precision.

In the case of GPS signals, two carrier frequencies can be utilized: L1 at about 1575.4 MHz, and L2 at about 1227.6 MHz. Besides redundancy and increased resistance to jamming, a benefit of having two frequencies transmitted from one satellite includes the ability to measure and account for frequency-dependent delay error. Since the ionospheric delay of a signal is dependent on the signal's frequency, a dual frequency receiver capable of measuring (and factoring out) such delay may provide improved data for positioning, meteorology, and/or other applications. Certain example implementations of the disclosed technology may utilize one of the GPS signals (L1 or L2) to reduce noise in the other respective signal (L2 or L1), as will be discussed in detail below.

Figure 2:
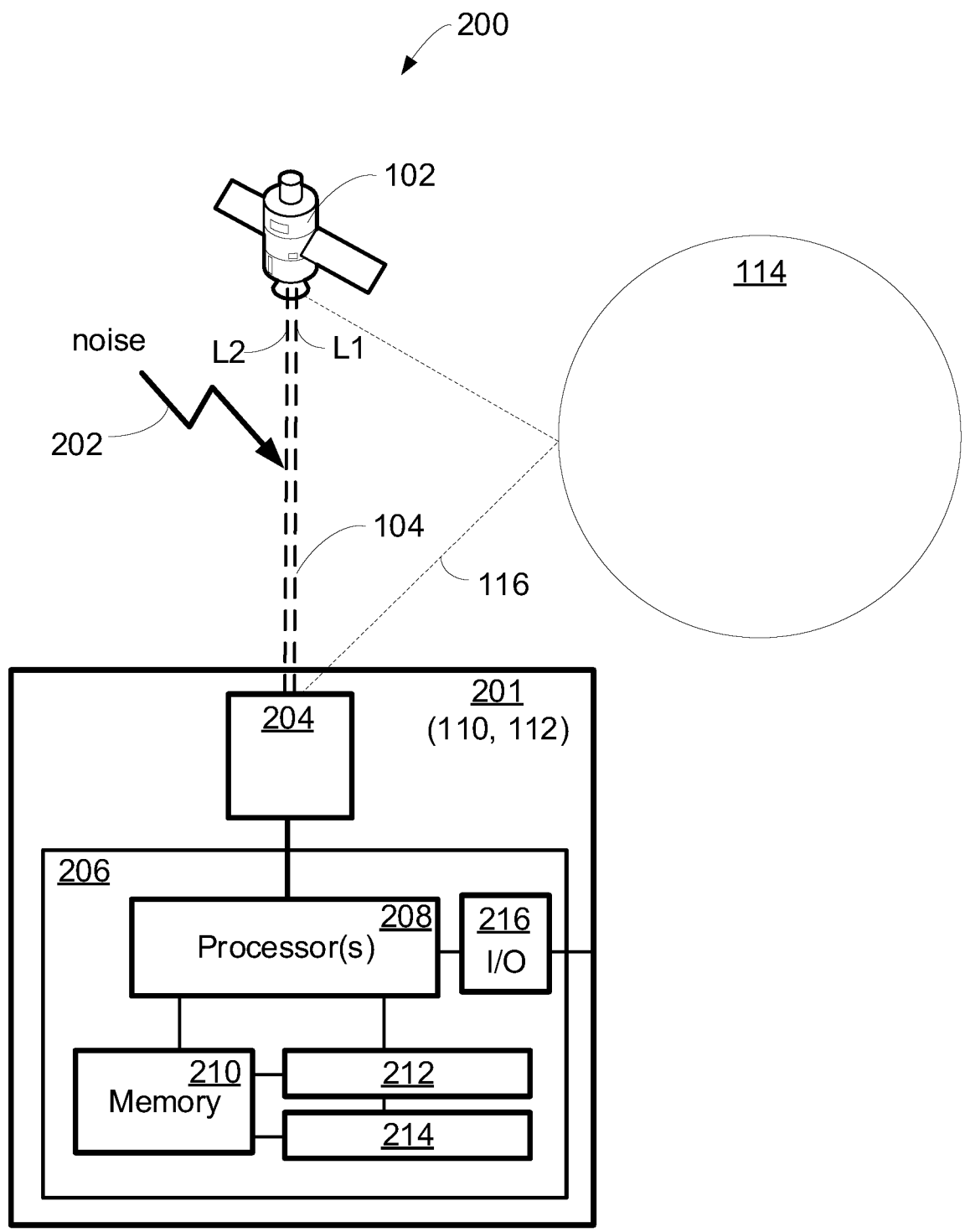
FIG. 2 depicts an example block diagram 200 of a satellite 102 and a receiver 201, according to an example implementation of the disclosed technology.

FIG. 2 depicts an example block diagram 200 of a GNSS satellite 102 and a receiver 201, according to an example implementation of the disclosed technology. As discussed with respect to FIG. 1, the receiver 201 may be associated with a different satellite 110 in low-earth orbit, a terrestrial base station 112, etc. As will be discussed further below with respect to FIG. 4, the GNSS satellite 102 may include a transmitter that synthesizes, modulates, and broadcasts the signals 104 that include L1 and L2 signals. Noise 202 and other artifacts (such as ionosphere/atmospheric-related phase delay) may affect signals at the L1 frequencies differently than signals at the L2 frequencies. The noise 202 in the L1 and L2 signals may be very different, but the propagation delays can be quite similar, and may be exploited, for example, to use the information of the less noisy signal (L1 or L2) to remove a significant fraction of the noise from the other signal (L2 or L1). Thus, according to certain example implementations of the disclosed technology, information derived from the L1 signals may be utilized to reduce noise in L2 signal, or vice-versa.

In accordance with certain example implementations of the disclosed technology, the signals 104 may be received by a front end 204 and digitized (as will be discussed with reference to FIG. 5). In accordance with certain example implementations of the disclosed technology, the digitized signals from the front end 204 may be further processed by one or more processors 208 in communication with memory 210. According to an example implementation of the disclosed technology, certain hardware 212 and/or software modules 214 may be utilized to process the digitized L1 and L2 streams and provide output 216, as will be further discussed below with reference to FIGS. 6A and 6B.

Figure 3:
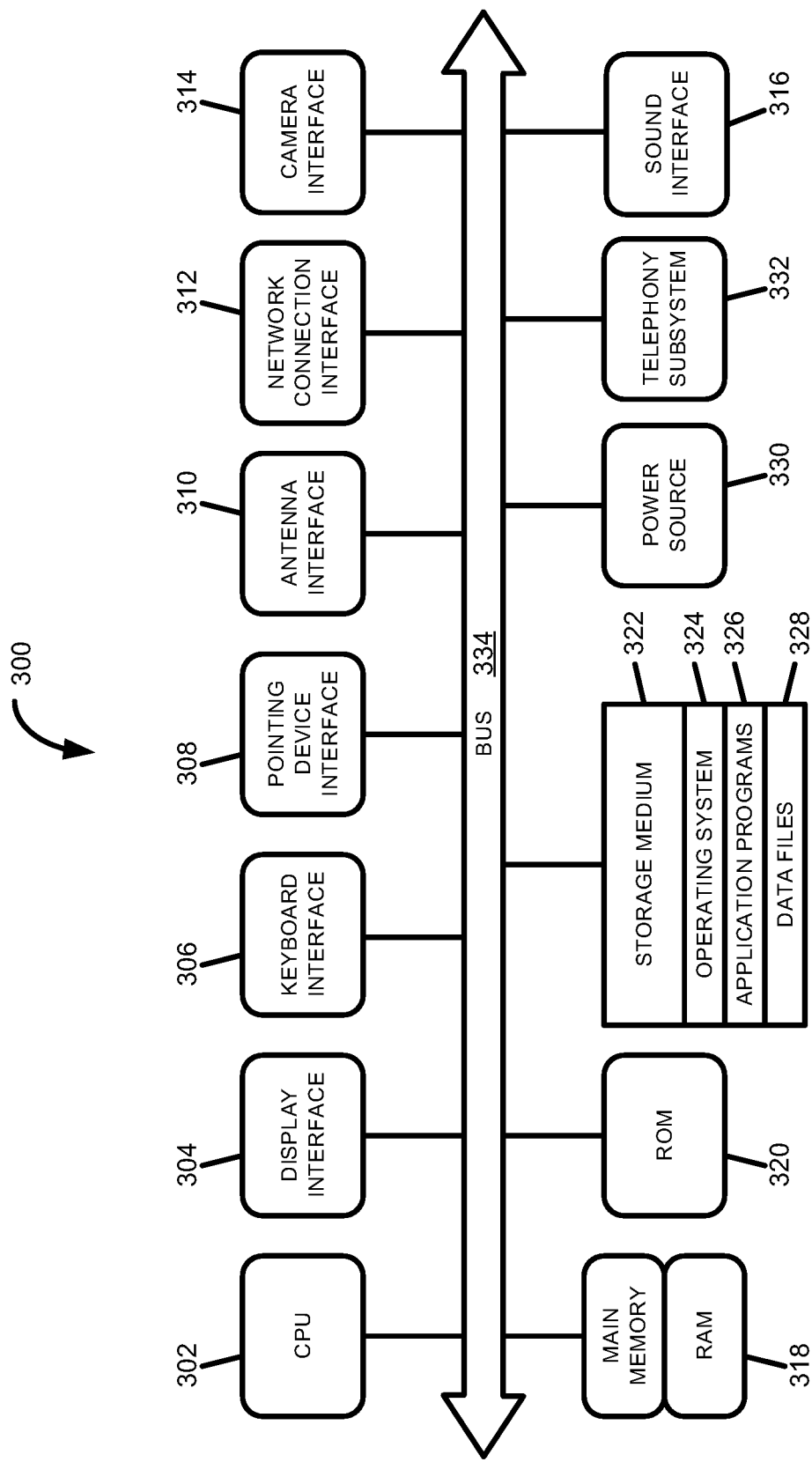
FIG. 3 depicts a block diagram of an illustrative computing device 300 according to an example implementation of the disclosed technology.

FIG. 3 depicts a block diagram of an illustrative computing device 300 according to an example implementation. Certain aspects of FIG. 3 may be embodied in a receiver (for example, the receiver 201 as shown in FIG. 2). According to one example implementation, the term "computing device," as used herein, may be a CPU, or conceptualized as a CPU (for example, the CPU 302 of FIG. 3). In this example implementation, the computing device (CPU) may be coupled, connected, and/or in communication with one or more peripheral devices, such as display. In certain implementation, the computing device 300 may be included in a terrestrial ground station (such as the ground station 112 as depicted in FIG. 1.) In another example implementation, the term computing device, as used herein, may refer to a processor and associated components, for example that may be installed in a satellite (such as the satellite 110 as depicted in FIG. 1).

In an example implementation, the computing device may output content to its local display and may transmit and receive messages via the antenna interface 310, the network connection interface 312, telephony subsystem 332, etc. In example implementation, the computing device may output content to an external display device (e.g., over Wi-Fi) such as a TV or an external computing system. It will be understood that the computing device 300 is provided for example purposes only and does not limit the scope of the various implementations of the communication systems and methods.

The computing device 300 of FIG. 3 includes a central processing unit (CPU) 302, where computer instructions are processed. Certain example implementations can include a display interface 304 that acts as a communication interface and provides functions for rendering video, graphics, images, and texts on the display. In certain example implementations of the disclosed technology, the display interface 304 may be directly connected to a local display, such as a touch-screen display associated with a mobile computing device. In another example implementation, the display interface 304 may be configured to provide content (for example, data, images, and other information as previously discussed) for an external/remote display that is not necessarily physically connected to the computing device 300. For example, a desktop monitor may be utilized for mirroring graphics and other information that is presented on a mobile computing device. In certain example implementations, the display interface 304 may wirelessly communicate, for example, via a Wi-Fi channel or other available network connection interface 312 to an external/remote display.

In an example implementation, the network connection interface 312 may be configured as a communication interface and may provide functions for rendering video, graphics, images, text, other information, or any combination thereof on the display. In one example, the computing device 300 may include a communication interface that may include one or more of: a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

According to an example implementation of the disclosed technology, the computing device 300 may include a keyboard interface 306 that provides a communication interface to a keyboard. In one example implementation, the computing device 300 may include a pointing device interface 308 for connecting to a presence-sensitive input interface. According to certain example implementations of the disclosed technology, the pointing device interface 308 may provide a communication interface to various devices such as a touch screen, a depth camera, etc.

The computing device 300 may be configured to use an input device via one or more of input/output interfaces (for example, the keyboard interface 306, the display interface 304, the pointing device interface 308, the antenna interface 310, the network connection interface 312, camera interface 314, sound interface 316, etc.) to allow a user to capture information into the computing device 300. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device 300 or may be a separate device. For example, the input device may be an accelerometer, a magnetometer, a digital camera, a microphone, and an optical sensor.

Certain example implementations of the computing device 300 may include an antenna interface 310 in communication with an antenna. Certain example implementations of the antenna interface 310 can include one or more of: a receiver, analog-to-digital converter, sampler, buffers, memory, and memory. Certain example implementations can include a network connection interface 312 that provides a communication interface to a network. In certain implementations, a camera interface 314 may act as a communication interface to provide functions for capturing digital images from a camera. In certain implementations, a sound interface 316 is provided as a communication interface for converting sound into electrical signals using a microphone and for converting electrical signals into sound using a speaker. According to example implementations, a random-access memory (RAM) 318 is provided, where computer instructions and data may be stored in a volatile memory device for processing by the CPU 302.

According to an example implementation, the computing device 300 includes a read-only memory (ROM) 320 where invariant low-level system code or data for basic system functions such as basic input and output (I/O), startup, or reception of keystrokes from a keyboard are stored in a non-volatile memory device. According to an example implementation, the computing device 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 and content files 328 are stored. In accordance with certain example implementations of the disclosed technology, the application programs 326 can include one or more of programs to: correlate, accumulate, discriminate, unfold multiply, divide, add, lowpass, etc. the digitized L1 and L2 signal streams.

According to an example implementation, the computing device 300 includes a power source 330 that provides an appropriate alternating current (AC) or direct current (DC) to power components. According to an example implementation, the computing device 300 can include a telephony subsystem 332 that allows the device 300 to transmit and receive sound over a telephone network. The constituent devices and the CPU 302 communicate with each other over a bus 334.

In accordance with an example implementation, the CPU 302 has appropriate structure to be a computer processor. In one arrangement, the computer CPU 302 may include more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Content may be stored in the RAM 318, where the content may be accessed by the computer CPU 302 during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

According to one example implementation, the terms computing device or mobile computing device, as used herein, may be a central processing unit (CPU), controller or processor, or may be conceptualized as a CPU, controller or processor (for example, the CPU processor 302 of FIG. 3). In yet other instances, a computing device may be a CPU, controller or processor combined with one or more additional hardware components. In certain example implementations, the computing device operating as a CPU, controller or processor may be operatively coupled with one or more peripheral devices, such as a display, navigation system, stereo, entertainment center, Wi-Fi access point, or the like.

In another example implementation, the term computing device, as used herein, may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, satellite processor, or some other like terminology. In an example embodiment, the computing device may output content to its local display or speaker(s). In another example implementation, the computing device may output content to an external display device (e.g., over Wi-Fi) such as a TV or an external computing system.

Figure 4:
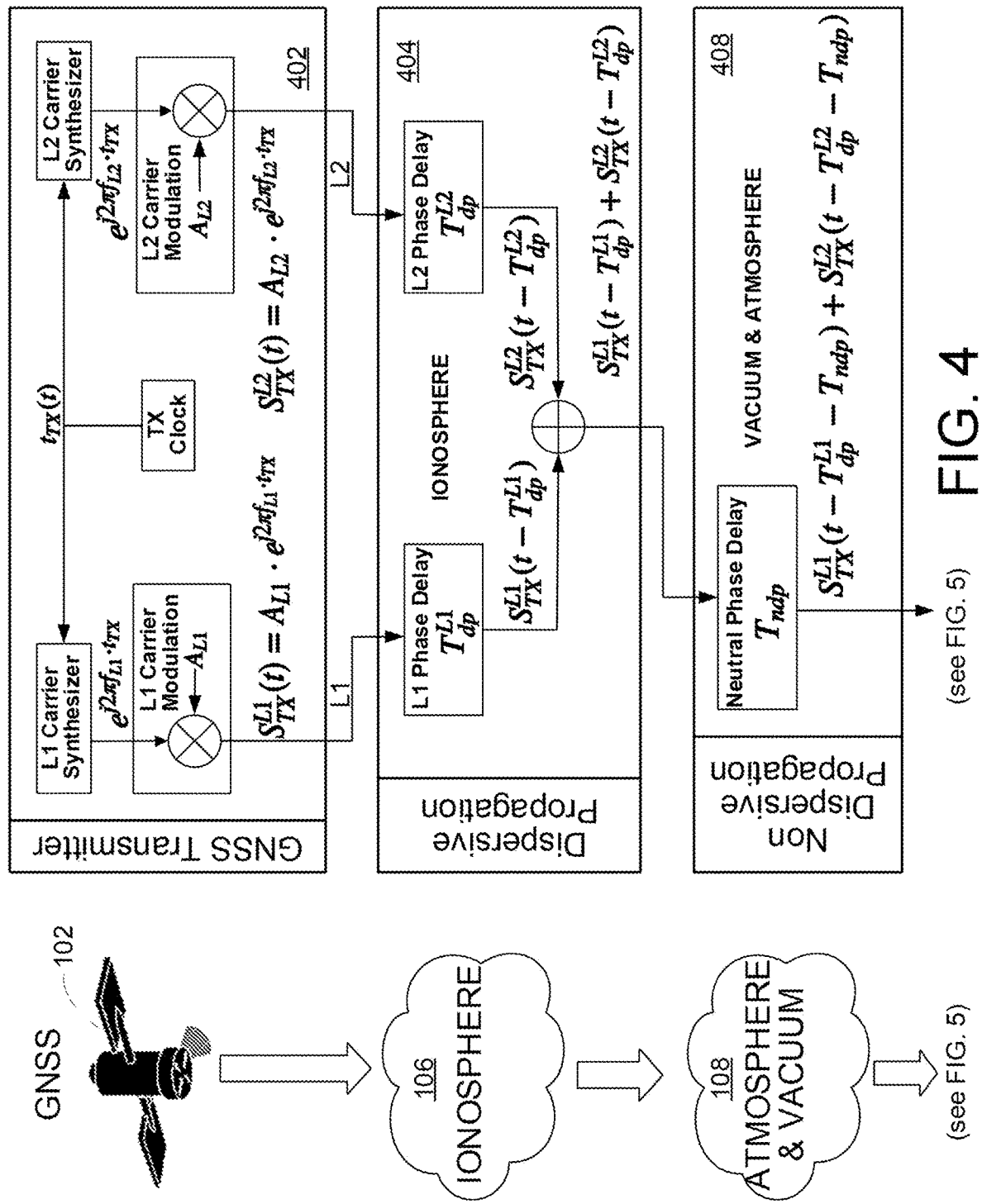
FIG. 4 depicts example L1 and L2 signals being generated at a GNSS satellite 102, with associated signal phase delay contributions due to dispersive and non-dispersive propagation.

FIG. 4 depicts an example block diagram of a GNSS transmitter 402 on a GNSS satellite 102, where the transmitter may be configured to synthesize the L1 carrier and the L2 carrier from a common transmitter clock. Thus, the L1 carrier and the L2 carrier can be characterized as being coherent with one another since both are derived from the same clock source. The GNSS transmitter 402 may modulate the respective L1 and L2 carriers with precision codes (PRN) and a navigation message broadcast information (collectively represented by $A_{L1}$ and $A_{L2}$ respectively), and the resulting L1 and L2 signals may be broadcast from the transmitter. FIG. 4 also depicts how the L1 and L2 signals may be affected by dispersive propagation 404 due to the ionosphere 106; and non-dispersive propagation 408 due to the atmosphere and vacuum 108, with associated signal phase delay as the signals travel from the transmitter to the receivers.

Figure 5:
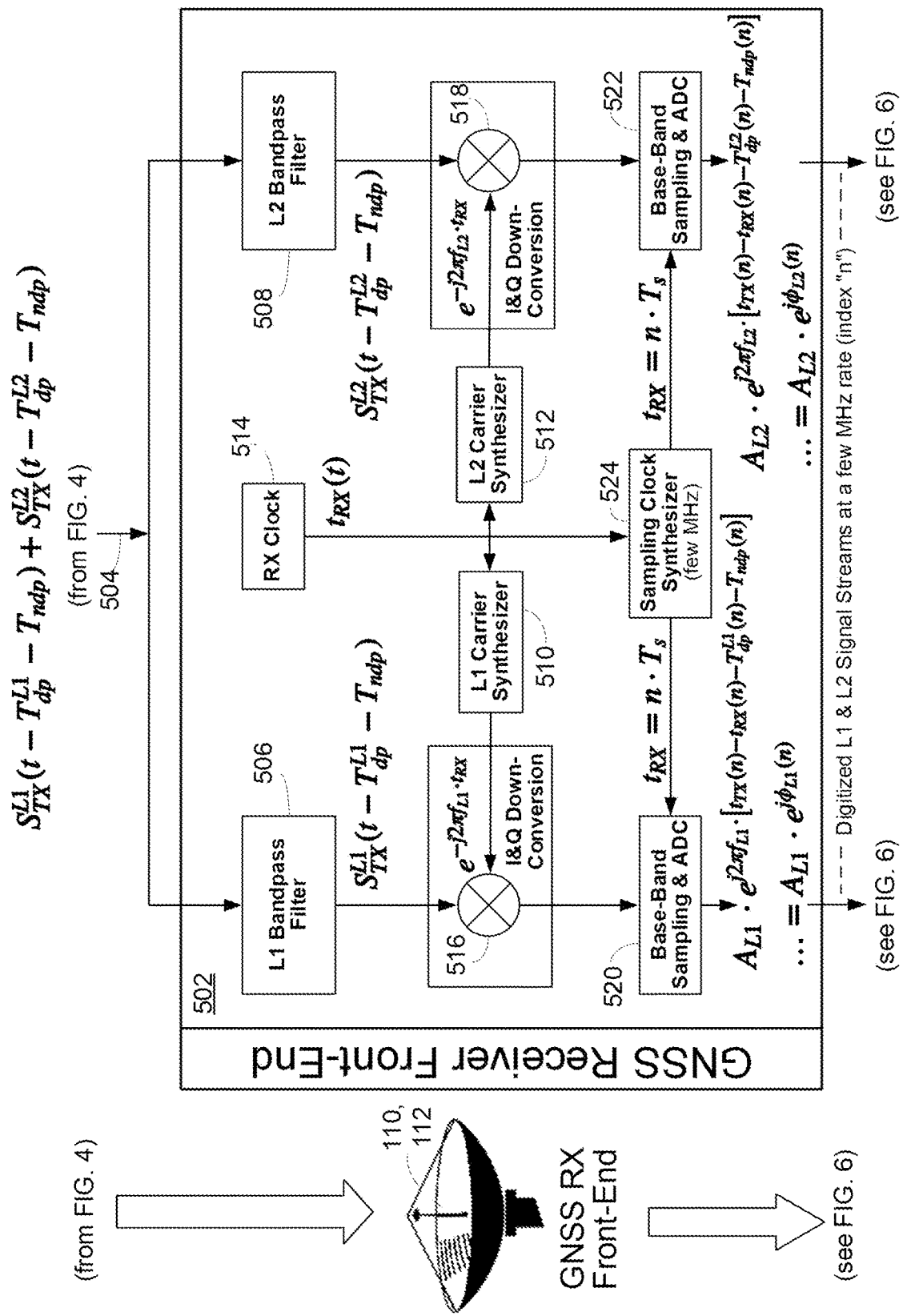
FIG. 5 depicts an example GNSS receiver front end 502 with associated processing and digitizing of the received GNSS signals, according to an example implementation of the disclosed technology.

FIG. 5 depicts an example GNSS receiver front end 502 with associated processing and digitizing of the received GNSS signals, according to an example implementation of the disclosed technology. For example, the combined propagated L1 and L2 signals 504 received at the GNSS receiver front-end 502 may be expressed as:

$$S_{TX}^{L1}(t - T_{dp}^{L1} - T_{ndp}) + S_{TX}^{L2}(t - T_{dp}^{L2} - T_{ndp})$$

where $$S_{TX}^{L1}(t) = A_{L1} \cdot e^{j2\pi f_{L1} \cdot t_{TX}}$$

represents the L1 signal transmitted by the GNSS transmitter, which is expressed as the L1 carrier modulated by the combined PRN and a navigation message broadcast information ($A_{L1}$). The L1 dispersive propagation phase delay is represented as $$T_{dp}^{L1}$$

and the neutral, non-dispersive propagation phase delay is represented as $$T_{ndp},$$

with similar expressions for the propagated L2 signal.

According to an example implementation of the disclosed technology, the GNSS receiver front-end 502 may utilize a L1 bandpass filter 506 and a L2 bandpass filter 508 to separate the respective combined propagated L1 and L2 signals 504, e.g., $$S_{TX}^{L1}(t - T_{dp}^{L1} - T_{ndp}) \text{ and } S_{TX}^{L2}(t - T_{dp}^{L2} - T_{ndp}).$$

In accordance with certain example implementations of the disclosed technology, a L1 carrier synthesizer 510 and a L2 carrier synthesizer 512 driven by the same receiver clock 514 may be utilized to down convert the band-passed, propagated L1 and L2 signals by a respective L1 I&Q down converter 516 and a L2 I&Q down converter 518. The respective outputs of the down converters 516, 518 may be further filtered (not shown), base-band sampled and converted to digitized signal streams respectively by L1 and L2 base-band samplers and analog to digital converters 520, 522, each of which have sample rates controlled by a common sampling clock synthesizer 524 that is also controlled by the receiver clock 514. The sampling clock synthesizer provides the discrete-time sampling: $t_{RX}=n \cdot T_s$, where n is a sample index and $T_s$ is the sampling interval.

The resulting digitized L1 signal stream can be expressed as:

$$A_{L1} \cdot e^{j2\pi f_{L1} \cdot [t_{TX}(n) - t_{RX}(n) - T_{dp}^{L1}(n) - T_{ndp}(n)]} \ldots = A_{L1} \cdot e^{j\phi_{L1}(n)},$$

and the resulting digitized L2 signal stream can be expressed as:

$$A_{L2} \cdot e^{j2\pi f_{L2} \cdot [t_{TX}(n) - t_{RX}(n) - T_{dp}^{L2}(n) - T_{ndp}(n)]} \ldots = A_{L2} \cdot e^{j\phi_{L2}(n)}.$$

Figure 6A:
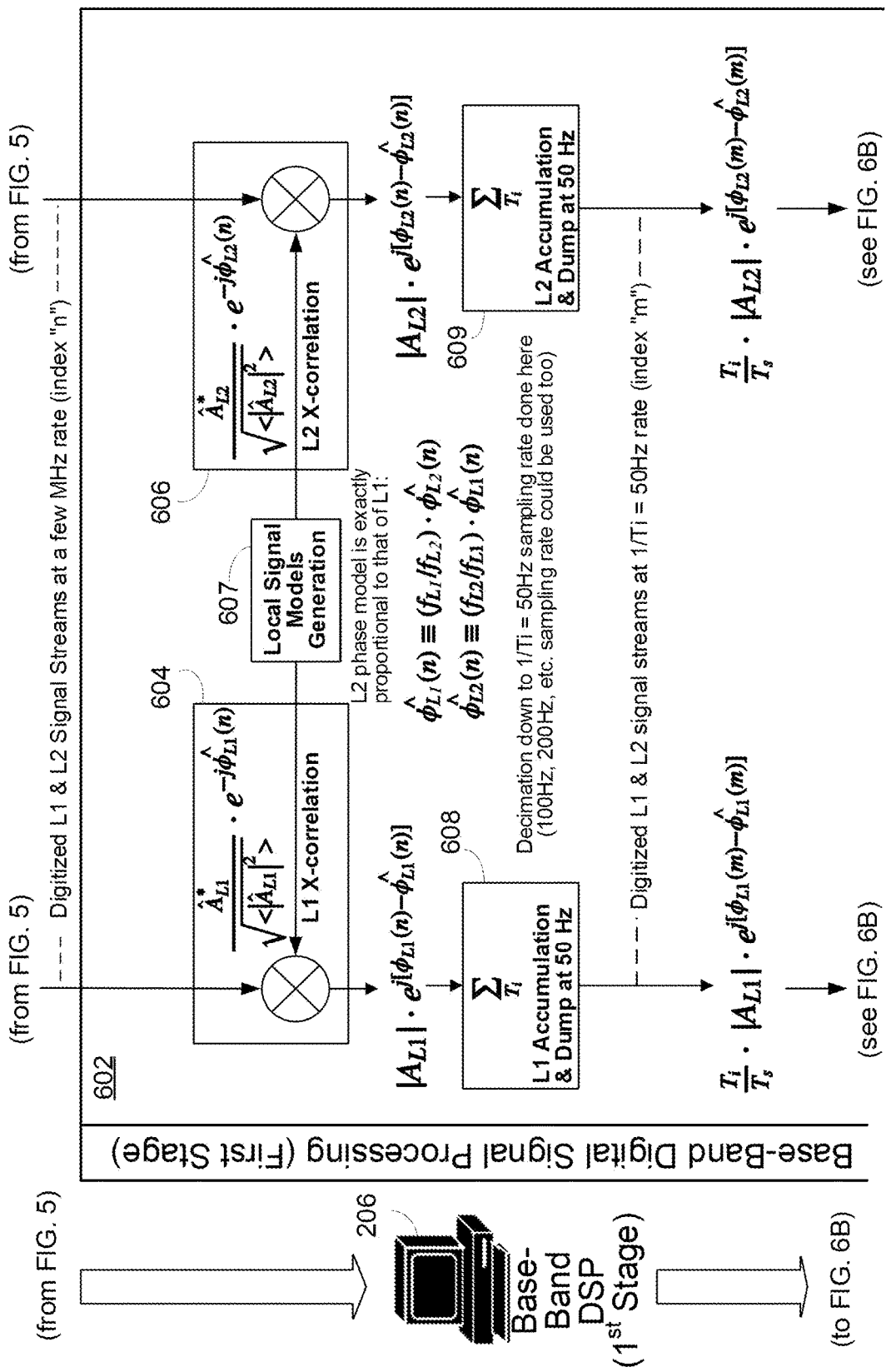
FIG. 6A depicts a block diagram of example (first stage) base-band digital signal processing of the digitized GNSS signals received from the receiver front end, according to an example implementation of the disclosed technology.

FIG. 6A is a block diagram of an example first stage base-band digital signal processing 602 of the digitized L1 and L2 signal streams (at a few MHz rate) received from the GNSS receiver front end 502.

In accordance with certain example implementations of the disclosed technology, the input signal (from FIG. 5) to the first stage base-band digital signal processing 602 corresponding to the L1 signal:

$$A_{L1} \cdot e^{j\phi_{L1}(n)}$$

may be cross correlated 604 with a locally generated 607 first local complex conjugate signal model:

$$\frac{\hat{A}_{L1}^*}{\sqrt{\langle |\hat{A}_{L1}|^2 \rangle}} \cdot e^{-j\hat{\phi}_{L1}(n)}.$$

The result of the L1 cross correlation 604 may be expressed as the phasor:

$$|A_{L1}| \cdot e^{j[\phi_{L1}(n) - \hat{\phi}_{L1}(n)]},$$

where $$\hat{\phi}_{L1}(n) \equiv (f_{L1}/f_{L2}) \cdot \hat{\phi}_{L2}(n).$$

Similarly, the input signal (from FIG. 5) corresponding to the L2 signal:

$$A_{L2} \cdot e^{j\phi_{L2}(n)}$$

may be cross correlated 606 with a locally generated 607 second local complex conjugate signal model:

$$\frac{\hat{A}_{L2}^*}{\sqrt{\langle |\hat{A}_{L2}|^2 \rangle}} \cdot e^{-j\hat{\phi}_{L2}(n)}.$$

The result of the L2 cross correlation 606 may be expressed as the phasor:

$$|A_{L2}| \cdot e^{j[\phi_{L2}(n) - \hat{\phi}_{L2}(n)]},$$

where $$\hat{\phi}_{L2}(n) \equiv (f_{L2}/f_{L1}) \cdot \hat{\phi}_{L1}(n).$$

In accordance with certain example implementations of the disclosed technology, the cross-correlators 604, 606 as discussed above may be utilized in a de-spreading process to multiply the analytic representations of the digitized base-band incoming signals:

$$A_{L1} \cdot e^{j\phi_{L1}(n)}$$

and $$A_{L2} \cdot e^{j\phi_{L2}(n)}$$

by the respective locally generated 607 complex-conjugate models of these signals. In an example implementation, the complex-conjugate models of the respective signals may be generated 607 utilizing knowledge of the structure of the transmitted signal (including the navigation data stream), and an estimate of the signal propagation delays. In accordance with certain example implementations of the disclosed technology, the unknown fraction of the propagation delay is a quantity that may be determined by the system. The unknown fraction of the propagation delay may be attributed to factors including but not limited to the unmodeled part of refraction delay due to atmosphere (for example, in radio occultation measurement applications), and/or the unknown exact position/height of the specular reflection point over the sea (for example, in GNSS-R phase-delay altimetry applications).

In certain example implementations, the cross correlation process (i.e., the L1 cross correlation 604 and/or the L2 cross correlation 606) may result in respective phasors with slowly "drifting" respective phases. The phase drift, for example, may be equal to a difference between the real propagation phase delay and the model of the delay, multiplied by 2*pi*fc, where fc is the carrier frequency (1575.42 MHz for L1 and 1227.6 MHz for L2). In certain example implementations, the bandwidth of the phasor signal may be very small (i.e., less than +/−25 Hz). As depicted in FIG. 6A, the output of the L1 cross correlation 604, $$|A_{L1}| \cdot e^{j[\phi_{L1}(n) - \phi^\wedge_{L1}(n)]},$$

may be accumulated 608 to produce a digitized L1 signal stream that is dumped at a rate equal to the inverse of the accumulation interval (for example, 1/Ti=50 Hz) with the accumulation 608 expressed as:

$$\frac{T_i}{T_s} \cdot |A_{L1}| \cdot e^{j[\phi_{L1}(m) - \phi^\wedge_{L1}(m)]}$$

Similarly, the output of the L2 cross correlation 606, $$|A_{L2}| \cdot e^{j[\phi_{L2}(n) - \phi^\wedge_{L2}(n)]},$$

may be accumulated 609 to produce a digitized L2 signal stream that is dumped at a rate equal to the inverse of the accumulation interval (for example, 1/Ti=50 Hz) with the accumulation 609 expressed as:

$$\frac{T_i}{T_s} \cdot |A_{L2}| \cdot e^{j[\phi_{L2}(m) - \phi^\wedge_{L2}(m)]}$$

In accordance with certain example implementations of the disclosed technology, the accumulation period may be as long as the inverse of the signal bandwidth (1/50 Hz=0.02 s) with shorter accumulation periods allowed. In certain example implementations, the accumulation 608, 609 may act as a low-pass filter to reject most of the noise present before the accumulations. In certain example implementations, the accumulation 608, 609 may increase the signal-to-noise ratio (SNR) output, which may be referred to as de-spreading gain.

Figure 6B:
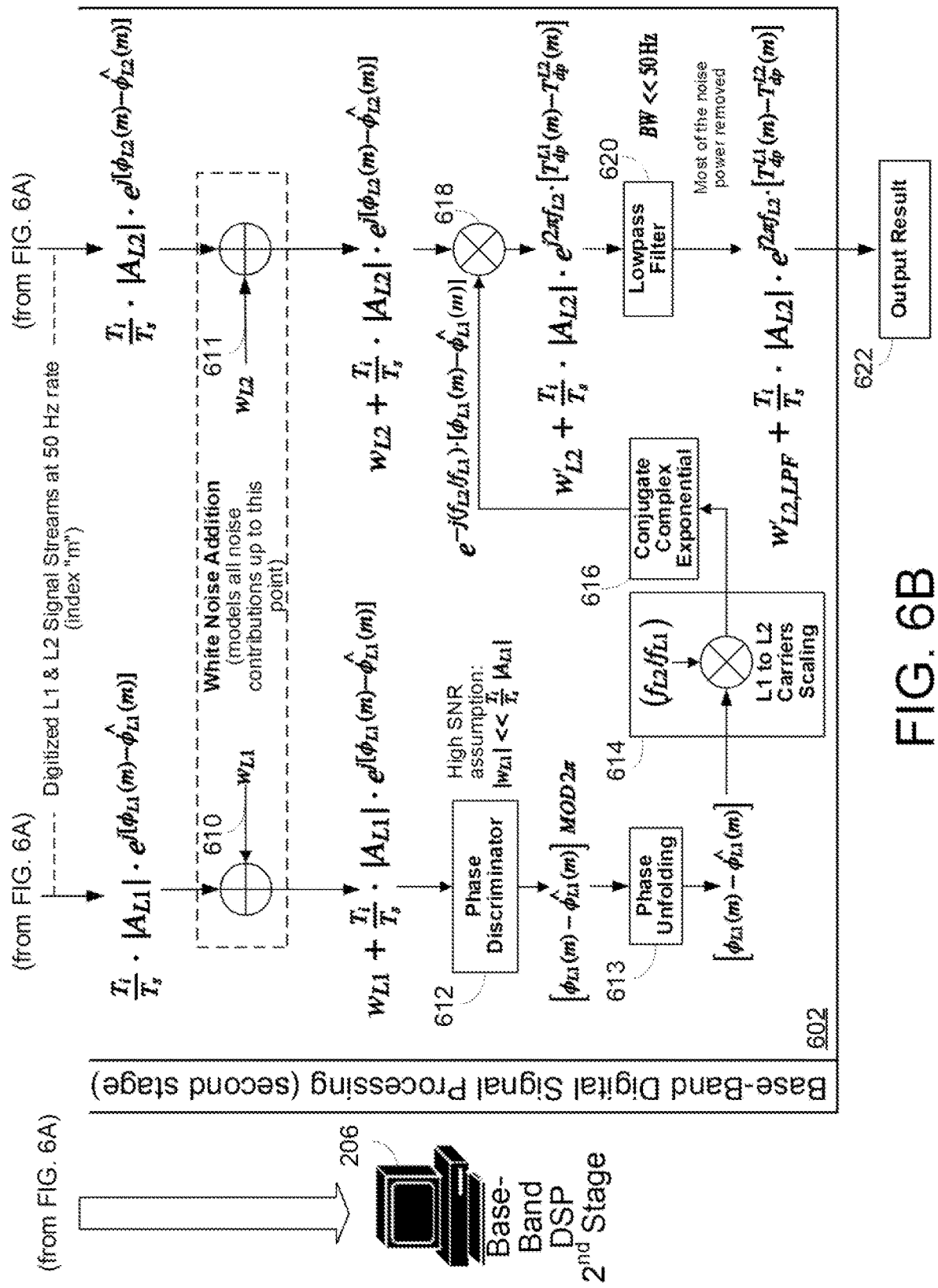
FIG. 6B depicts a block diagram of example (second stage) base-band digital signal processing of the signals received from the first stage (FIG. 6A) according to an example implementation of the disclosed technology.

FIG. 6B depicts a block diagram of example continued (second-stage) base-band digital signal processing of the digitized L1 and L2 signal streams (i.e., received from the first stage as shown in FIG. 6A) according to an example implementation of the disclosed technology. In practice, noise (as depicted by noise 202 shown in FIG. 2) may be added into the L1 and/or L2 signals via a number of points, including in the transmitter, the propagation media, the antennae, the receiver, etc. In practice most of the noise may be picked up by the antenna and the receiver amplifier. To represent the added noise, and rather than adding noise into every single stage, the contributions of all noise may be optionally modeled and added to the respective digitized L1 and L2 signal streams. In certain example implementations of the disclosed technology the noise contributions may be modeled as white noise. In certain example implementations, the optional addition of the noise may be utilized to model the noise reduction capabilities of the base-band signal processor 602.

In accordance with certain example implementations of the disclosed technology, white noise $w_{L1}$ 610 and $w_{L2}$ 611 may be added to respective 50 Hz L1 and L2 digitized signal streams, for example, to model noise contributions in the respective signals and resulting a L1+noise signal:

$$w_{L1} + \frac{T_i}{T_s} \cdot |A_{L1}| \cdot e^{j[\phi_{L1}(m) - \phi^\wedge_{L1}(m)]},$$

and a L2+noise signal:

$$w_{L2} + \frac{T_i}{T_s} \cdot |A_{L2}| \cdot e^{j[\phi_{L2}(m) - \phi^\wedge_{L2}(m)]},$$

with a signal to noise assumption that $|w_{L1}| << (T_i/T_s)|A_{L1}|$.

In accordance with certain example implementations of the disclosed technology, the L1+noise signal may be fed into a phase discriminator 612 resulting in an output of:

$$[\phi_{L1}(m) - \phi^\wedge_{L1}(m)] MOD\, 2\pi.$$

The output of the phase discriminator 612 may undergo phase unfolding 613, resulting in:

$$[\phi_{L1}(m) - \phi^\wedge_{L1}(m)],$$

which may then be scaled 614 by the L2 frequency (1227.6 MHz) divided by the L1 frequency (1575.42 MHz), or about 0.779. After the scaling 614, the resulting scaled phase may undergo conjugation (or negation) of the complex exponential 616, resulting in the conjugate complex exponential:

$$e^{-j(f_{L2}/f_{L1}) \cdot [\phi_{L1}(m) - \phi^\wedge_{L1}(m)]},$$

which may then be multiplied 618 by $$w_{L2} + \frac{T_i}{T_s} \cdot |A_{L2}| \cdot e^{j[\phi_{L2}(m) - \phi^\wedge_{L2}(m)]}$$

to produce $$w'_{L2} + \frac{T_i}{T_s} \cdot |A_{L2}| \cdot e^{j 2\pi f_{L2}} \cdot [T^{L1}_{dp}(m) - T^{L2}_{dp}(m)].$$

This resulting signal may then be filtered with lowpass filter 620 having bandwidth<<50 Hz, thus removing most of the noise power, and producing an output result 622 of the filtered L2 observable, which can be expressed as:

$$w'_{L2,LPF} + \frac{T_i}{T_s} \cdot |A_{L2}| \cdot e^{j 2\pi f_{L2}} \cdot [T^{L1}_{dp}(m) - T^{L2}_{dp}(m)].$$

Thus, according to certain example implementations of the disclosed technology, the atmosphere-induced dynamics (i.e., non-dispersive propagation 408 as show in FIG. 4) may be eliminated (or reduced), and only the dynamics of the ionospheric propagation (i.e., dispersive propagation 404 as shown in FIG. 4) path difference between the L1 and L2 signal remain. Since the difference in the L1 and L2 signal dynamics due to ionospheric propagation may be relatively slow, the output result 622 may be low-pass filtered to further reject noise while retaining the $A_{L2}$ signal.

As described above, the L1 signal received at the GNSS receiver front-end 502 may be processed (i.e., filtered, down-converted, sampled, etc.) and utilized to reduce noise in the corresponding L2 signal. As should be appreciated, the role of the L1 and L2 signals may be swapped in the base-band digital signal processing block diagram 602 of FIGS. 6A and 6B. For example, a similar process may utilize L2 to remove noise in the L1 signal and retain the $A_{L1}$ signal.

In accordance with certain example implementations of the disclosed technology, and as previously mentioned, unwanted noise (for example, noise 202 as shown in FIG. 2) may be injected into the L1 and/or L2 signals due to any number of sources, including but not limited to the ionosphere, atmosphere, electrical activity, and even unintended electronic noise produced inside the receiver itself. Since the L1 and L2 carrier frequencies differ, each may be more or less susceptible to noise than the other. Certain example implementations of the disclosed technology may provide the technical benefit of utilizing the less noisy signal (L1 or L2) to remove or reduce noise in the corresponding signal (L2 or L1).

Figure 7:
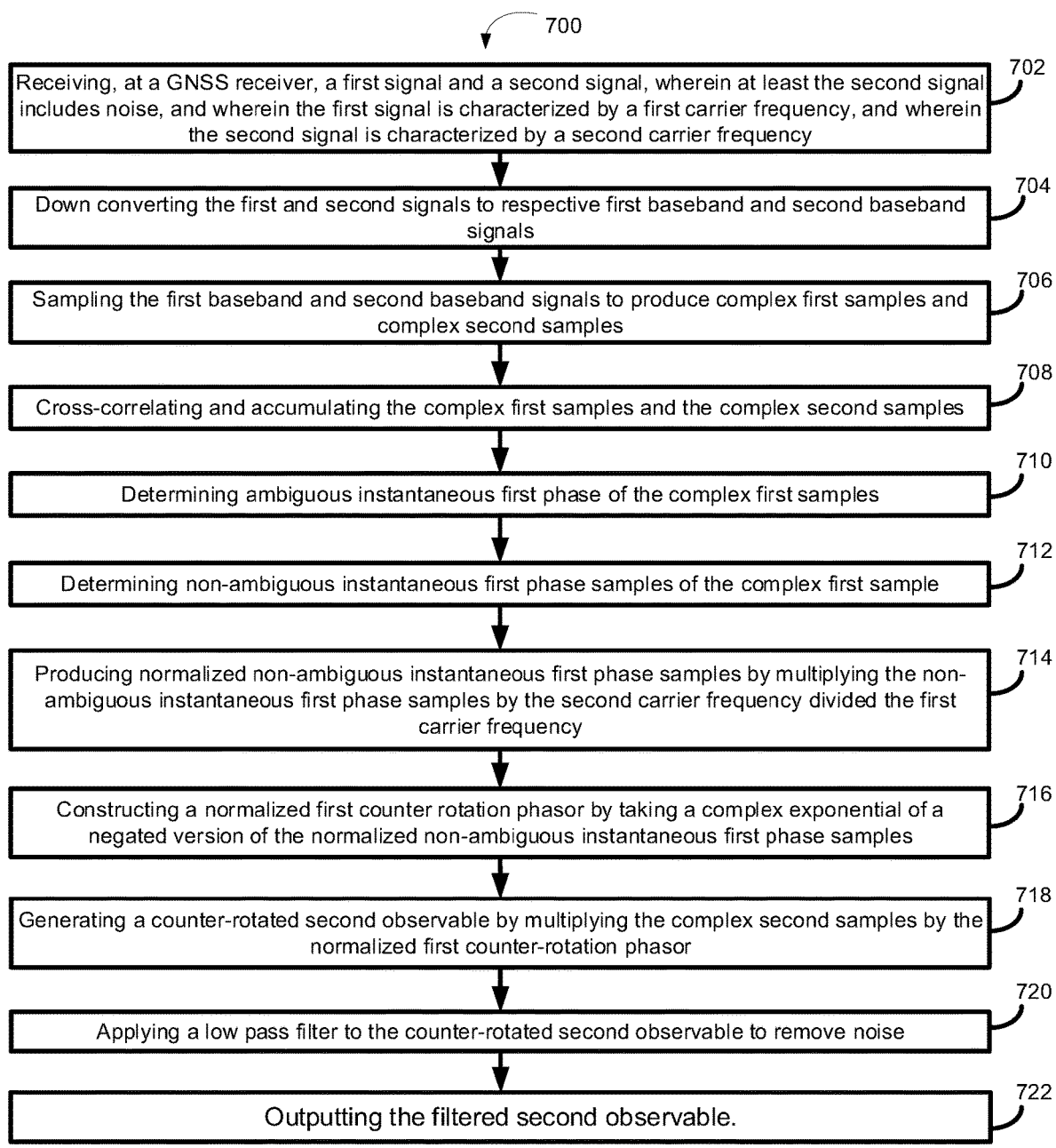
FIG. 7 depicts an example flow diagram of a method 700 according to an example implementation of the disclosed technology.

FIG. 7 depicts an example flow diagram of a method 700 for reducing noise in dual-frequency GNSS signal observation, according to an example implementation of the disclosed technology. In block 702, the method 700 includes receiving, at a GNSS receiver, a first signal and a second signal, wherein at least the second signal includes noise, and wherein the first signal is characterized by a first carrier frequency, and wherein the second signal is characterized by a second carrier frequency. In block 704, the method 700 includes down converting the first and second signals to respective first baseband and second baseband signals. In block 706, the method 700 includes sampling the first baseband and second baseband signals to produce complex first samples and complex second samples. In block 708, the method 700 includes cross-correlating and accumulating the complex first samples and the complex second samples. In block 710, the method 700 includes determining ambiguous instantaneous first phase of the complex first samples. In block 712, the method 700 includes determining non-ambiguous instantaneous first phase samples of the complex first samples. In block 714, the method 700 includes producing normalized non-ambiguous instantaneous first phase samples by multiplying the non-ambiguous instantaneous first phase samples by the second carrier frequency divided the first carrier frequency. In block 716, the method 700 includes constructing a normalized first counter rotation phasor by taking a complex exponential of a negated version of the normalized non-ambiguous instantaneous first phase samples. In block 718, the method 700 includes generating a counter-rotated second observable by multiplying the complex second samples by the normalized first counter-rotation phasor. In block 720, the method 700 includes applying a low pass filter to the counter-rotated second observable to remove noise. In block 722, the method 700 includes outputting the filtered second observable.

In accordance with certain example implementations of the disclosed technology, sampling the first baseband and second baseband signals generates first and second digital sequences. In some example implementations, accumulating the first and second complex digital sequences comprises accumulation over 20 ms intervals. In some example implementations, accumulating the first and second complex digital sequences comprises accumulation over intervals ranging from 1 ms to 100 ms.

According to an example implementation of the disclosed technology, the first signal and a second signal are in coherence.

In certain example implementations, the first carrier frequency is about 1.227 GHz and wherein the second carrier frequency is about 1.57 GHz. In certain example implementations, the first carrier frequency is about 1.57 GHz and wherein the second carrier frequency is about 1.227 GHz.

In accordance with certain example implementations of the disclosed technology, the ambiguous instantaneous phase of the complex first samples are $2\pi$ ambiguous. In certain example implementations, the ambiguous instantaneous phase of the complex second samples are $2\pi$ ambiguous.

In certain example implementations, the first signal includes more noise than the second signal. In certain example implementations, the second signal includes more noise than the first signal.

In accordance with certain example implementations of the disclosed technology, the time intervals over which the first and second complex digital sequences are accumulated may impact the signal-to-noise ratio (SNR), with the SNR proportional to the accumulation interval. In certain example implementations, a 20 ms accumulation interval may provide the highest SNR without aliasing fast dynamics of the associated signals, which may be due to changes in the atmosphere or other factors.

Various implementations of the systems and methods herein may be embodied in non-transitory computer readable media for execution by a processor. An example implementation may be used in an application of a computing device, such as a portable computer, tablet PCs, Internet tablets, PDAs, ultra mobile PCs (UMPCs), etc.

In the preceding description, numerous specific details have been set forth. However, it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for reducing noise in dual-frequency signal observation, the method comprising:
   receiving a first signal and a second signal, wherein the first signal is characterized by a first carrier frequency, and wherein the second signal is characterized by a second carrier frequency;
   down converting and sampling the first and second signals to produce complex first samples and complex second samples;
   de-spreading the complex first samples and the complex second samples;
   determining ambiguous instantaneous first phase samples and a non-ambiguous instantaneous first phase samples of de-spread complex first samples and complex second samples;
   producing normalized non-ambiguous instantaneous first phase samples by multiplying the non-ambiguous instantaneous first phase samples by the second carrier frequency divided the first carrier frequency;
   constructing a normalized first counter-rotation phasor by taking a complex exponential of a negated version of the normalized non-ambiguous instantaneous first phase samples;
   generating a counter-rotated second observable by multiplying the complex second samples by the normalized first counter-rotation phasor; and
   applying a low pass filter to the counter-rotated second observable to remove noise to produce a filtered second observable.

2. The method of claim 1, wherein the de-spreading comprises cross-correlating and accumulating the complex first samples and the complex second samples.

3. The method of claim 1, further comprising outputting the filtered second observable.

4. The method of claim 1, wherein the de-spreading comprises accumulating over an interval selected from a range of 1 ms to 100 ms.

5. The method of claim 1, wherein the first carrier frequency is 1.227 GHz and wherein the second carrier frequency is 1.57 GHz.

6. The method of claim 1, wherein the first carrier frequency is 1.57 GHz and wherein the second carrier frequency is 1.227 GHz.

7. The method of claim 1, wherein the ambiguous instantaneous phase of one or more of the complex first samples and complex second samples are $2\pi$ ambiguous.

8. The method of claim 1, wherein the first signal includes more noise than the second signal.

9. The method of claim 1, wherein the second signal includes more noise than the first signal.

10. The method of claim 1, wherein the first signal and a second signal are in coherence.

11. A system comprising:
    an antenna;
    an RF to baseband converter;
    one or more analog to digital (A/D) converters;
    a digital signal processing (DSP) processor; and
    memory in communication with the DSP processor;
    wherein the system is configured to:
      receive, at the antenna, a first signal and a second signal, wherein the first signal is characterized by a first carrier frequency, and wherein the second signal is characterized by a second carrier frequency;
      down convert, with the RF to baseband converter, the first and second signals to respective first baseband and second baseband signals;
      sample, with the one or more A/D converters, the first baseband and second baseband signals to produce complex first samples and complex second samples;
      de-spread the complex first samples and the complex second samples determine, with the DSP processor, ambiguous instantaneous first phase samples and non-ambiguous instantaneous first phase samples of the de-spread complex first samples and the de-spread complex second samples;
      produce normalized non-ambiguous instantaneous first phase samples by multiplying the non-ambiguous instantaneous first phase samples of the result by the second carrier frequency divided the first carrier frequency;
      construct a normalized first counter-rotation phasor by taking a complex exponential of a negated version of the normalized non-ambiguous instantaneous first phase samples;
      generate a counter-rotated second observable by multiplying the complex second samples by the normalized first counter-rotation phasor;
      apply a low pass filter to the counter-rotated second observable to remove noise to produce a filtered second observable; and
      output the filtered second observable.

12. The system of claim 11, further comprising a front end, wherein the front end is configured to filter at least a portion of the received first and second signals.

13. The system of claim 11, wherein the DSP processor is configured to de-spread the complex first samples and the complex second samples by cross-correlating and accumulating the complex first samples and the complex second samples.

14. The system of claim 11, wherein the DSP processor is configured to de-spread the first and second complex samples by accumulating over an interval selected from a range between about 1 ms and about 100 ms.

15. The system of claim 11, wherein the first carrier frequency is 1.227 GHz and wherein the second carrier frequency is 1.57 GHz.

16. The system of claim 11, wherein the first carrier frequency is 1.57 GHz and wherein the second carrier frequency is 1.227 GHz.

17. The system of claim 11, wherein the second signal includes more noise than the first signal.

18. The system of claim 11, wherein the first signal includes more noise than the second signal.

19. The system of claim 11, wherein the DSP processor is configured to output the filtered second observable.

20. A non-transitory computer readable storage medium storing instructions for use with one or more processors in communication with a memory, and wherein the instructions are configured to cause the one or more processors to perform a method comprising:
- receiving a first signal and a second signal, wherein the first signal is characterized by a first carrier frequency, and wherein the second signal is characterized by a second carrier frequency;
- down converting and sampling the first and second signals to produce complex first samples and complex second samples;
- de-spreading the complex first samples and the complex second samples;
- determining ambiguous instantaneous first phase samples and a non-ambiguous instantaneous first phase samples of de-spread complex first samples and complex second samples;
- producing normalized non-ambiguous instantaneous first phase samples by multiplying the non-ambiguous instantaneous first phase samples by the second carrier frequency divided the first carrier frequency;
- constructing a normalized first counter-rotation phasor by taking a complex exponential of a negated version of the normalized non-ambiguous instantaneous first phase samples;
- generating a counter-rotated second observable by multiplying the complex second samples by the normalized first counter-rotation phasor; and
- applying a low pass filter to the counter-rotated second observable to remove noise to produce a filtered second observable.

* * * * *